(12) United States Patent
Schmidt et al.

(10) Patent No.: US 11,591,231 B2
(45) Date of Patent: Feb. 28, 2023

(54) ORGANOTEMPLATE-FREE SYNTHESIS OF A ZEOLITE OF TON FRAMEWORK TYPE

(71) Applicant: CHEVRON U.S.A. INC., San Ramon, CA (US)

(72) Inventors: Joel Edward Schmidt, Oakland, CA (US); Adeola Florence Ojo, Pleasant Hill, CA (US); Cong-Yan Chen, Kensington, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 61 days.

(21) Appl. No.: 17/358,472

(22) Filed: Jun. 25, 2021

(65) Prior Publication Data
US 2022/0185685 A1    Jun. 16, 2022

Related U.S. Application Data

(60) Provisional application No. 63/111,828, filed on Nov. 10, 2020.

(51) Int. Cl.
*B01J 29/70*     (2006.01)
*B01J 29/74*     (2006.01)
*C01B 39/46*     (2006.01)

(52) U.S. Cl.
CPC .................. *C01B 39/46* (2013.01)

(58) Field of Classification Search
None
See application file for complete search history.

(56) References Cited

U.S. PATENT DOCUMENTS

| | | | | |
|---|---|---|---|---|
| 4,072,622 | A * | 2/1978 | Kuhling | C11D 3/1286 510/532 |
| 4,481,177 | A | 11/1984 | Valyocsik | |
| 4,483,835 | A | 11/1984 | Zones | |
| 4,533,649 | A | 8/1985 | Ball et al. | |
| 4,622,166 | A * | 11/1986 | Nakazawa | C11D 3/1286 510/532 |
| 4,900,528 | A | 2/1990 | Lowe et al. | |
| 4,902,406 | A | 2/1990 | Valyocsik | |
| 5,336,478 | A * | 8/1994 | Dwyer | C10G 45/64 423/708 |
| 5,342,596 | A | 8/1994 | Barri et al. | |
| 5,783,168 | A * | 7/1998 | Verduijn | B01J 29/04 423/709 |
| 2004/0005271 | A1 | 1/2004 | Zones et al. | |
| 2012/0114552 | A1 * | 5/2012 | Ziemer | C01B 39/48 423/700 |
| 2018/0155307 | A1 * | 6/2018 | Metkar | C07D 307/68 |

FOREIGN PATENT DOCUMENTS

| | | |
|---|---|---|
| EP | 0065400 A2 | 11/1982 |
| EP | 0087017 A1 | 8/1983 |
| EP | 0220893 A2 | 5/1987 |
| WO | 2011157839 A1 | 12/2011 |

OTHER PUBLICATIONS

PCT International Search Report, International Appl. No. PCT/IB2021/055642, dated Sep. 29, 2021.
Y. Wang, C. Zhu, J. Qiu, F. Jiang, X. Meng, X. Wang, C. Lei, Y. Jin, S. Pan and F-S. Xiao "Organotemplate-Free Synthesis of a High-Silica Zeolite with a TON Structure in the Absence of Zeolite Seeds" Eur. J. Inorg. Chem. 2016, 1364-1368.
Y. Wang, X. Wang, Q. Wu, X. Meng, Y. Jin, X. Zhou and F-S. Xiao "Seed-directed and organotemplate-free synthesis of TON zeolite" Catal. Today 2014, 226, 103-108.
S. Ernst, J. Weitkamp, J.A. Martens and P.A. Jacobs "Synthesis and Shape-Selective Properties of ZSM-22" Appl. Catal 1989, 48, 137-148.
L.M. Parker and D.M. Bibby "Synthesis and some properties of two novel zeolites, KZ-1 and KZ-2" Zeolites 1983, 3, 8-11.
Q. Wu, L. Zhu, Y. Chu, X. Liu, C. Zhang, J. Zhang, H. Xu, F. Deng, Z. Feng, X. Meng and F-S. Xiao "Sustainable Synthesis of Pure Silica Zeolites from a Combined Strategy of Zeolite Seeding and Alcohol Filling" Angew. Chem. Int. Ed. 2019, 58, 12138-12142.

\* cited by examiner

*Primary Examiner* — Sheng H Davis (57) ABSTRACT

An organotemplate-free synthetic process for the production of a zeolite of TON framework type structure is provided. The process includes the steps of: (1) preparing a mixture comprising: (a) an alumina-coated silica; (b) a source of an alkali metal; (c) an alcohol; (d) a source of hydroxide ions; (e) seed crystals comprising a zeolitic material having a TON framework type structure; and (f) water; and (2) crystallizing the mixture obtained in step (1).

13 Claims, 10 Drawing Sheets

ORGANOTEMPLATE-FREE SYNTHESIS OF A ZEOLITE OF TON FRAMEWORK TYPE

CROSS-REFERENCE TO RELATED APPLICATIONS

This application claims priority to and the benefit of U.S. Provisional Application Ser. No. 63/111,828, filed Nov. 10, 2020.

FIELD

This disclosure relates to a synthetic organotemplate-free zeolite of TON framework type structure, its synthesis, and uses thereof.

BACKGROUND

Zeolites are porous crystalline materials constructed of repeating $SiO_4$ and $AlO_4$ tetrahedral units. These units are linked together to form frameworks having regular intra-crystalline cavities and channels of molecular dimensions. Numerous types of synthetic zeolites have been synthesized and each has a unique framework based on the specific arrangement of its tetrahedral units. By convention, each framework type is assigned a unique three-letter code by the International Zeolite Association (IZA).

Zeolitic materials of the TON framework type are characterized by one-dimensional elliptical 10-membered ring (10-MR) channels. Examples of zeolitic materials of the TON framework type include ISI-1, KZ-2, NU-10, Theta-1, and ZSM-22. TON framework type zeolites can be used as a catalyst for various processes, such as dewaxing hydrocarbon feedstocks.

Generally, the synthesis of TON framework type zeolites is carried out in the presence of a nitrogen-containing organotemplate, where the organotemplate is involved in crystallization directing and micropore filling. Subsequent removal of the organotemplate in the micropores of the resulting zeolite is necessary that it may be effectively employed in an application. The organotemplate may usually only be removed by a calcination process or the like, such that a recycling of the organotemplate is not possible. Furthermore, removal of the organotemplate by calcination at higher temperatures, normally at 450° C. to 930° C. or even higher, is not only disadvantageous due to the destruction of the organotemplate, but also results in excess energy consumption and produces harmful gases and other unwanted waste products.

Accordingly, there also exists a need for an organotemplate-free synthetic process which may provide a zeolite having the TON framework type structure.

SUMMARY

In a first aspect, there is provided an organotemplate-free synthetic process for the production of a zeolite of TON framework type, wherein the process comprises the step of: (1) preparing a mixture comprising: (a) an alumina-coated silica; (b) a source of an alkali metal (M); (c) an alcohol (Q); (d) a source of hydroxide ions; (e) seed crystals comprising a zeolitic material having a TON framework type structure; and (f) water; and (2) crystallizing the mixture obtained in step (1).

In a second aspect, there is provided a synthetic organotemplate-free zeolite of TON framework type structure, wherein the zeolite optionally comprises one or more alkali metals (M), wherein the zeolite is non-calcined.

In a third aspect, there is provided a process for hydroisomerizing a paraffinic hydrocarbon feedstream, the process comprising contacting the hydrocarbon feedstream at hydroisomerization conditions with hydrogen and a catalyst comprising a zeolite of TON framework type, wherein the zeolite is non-calcined.

DETAILED DESCRIPTION

Definitions

In this specification, the following words and expressions, if and when used, have the meanings given below.

The term "framework type" has the meaning described in the "*Atlas of Zeolite Framework Types*" by Ch. Baerlocher, L. B. McCusker and D. H. Olson (Elsevier, Sixth Revised Edition, 2007).

The term "organotemplate" designates any conceivable nitrogen-containing organic material which is suitable for template-mediated synthesis of a zeolite material, particularly of a zeolite material of TON framework type structure.

An "organotemplate-free" synthetic process relates to a synthetic process wherein the materials used therein are substantially free of nitrogen-containing organotemplate materials, wherein "substantially" as employed in the present disclosure with respect to the amount of one or more organotemplates contained in the one or more materials used in a synthetic process indicates an amount of 0.1 wt. % or less of one or more organotemplates (e.g., 0.05 wt. % or less, 0.001 wt. % or less, 0.0005 wt. % or less, or 0.0001 wt. % or less). The amounts of one or more organotemplates, if at all present an any one of the materials used in the synthetic process, may also be denoted as "impurities" or "trace amounts" within the meaning of the present disclosure. Furthermore, it is noted that the terms "organotemplate" and "organic structure directing agent" are synonymously used in the present disclosure.

The term "alcohol" refers to an alkyl substituted with at least one hydroxy substituent.

The term "alkyl" refers to a branched, straight-chain or cyclic saturated hydrocarbon group.

The term "extra-framework" designates cations which are located at the ion-exchangeable sites of a zeolite (e.g., on the surface of and/or within the cages and/or pores of the zeolite) and thus serve to compensate the negative charge of the zeolite framework.

Synthesis of the Zeolite

The present disclosure provides an organotemplate-free synthetic process for the production of a zeolite of TON framework type, wherein the process comprises the steps of: (1) preparing a mixture comprising: (a) an alumina-coated silica; (b) a source of an alkali metal (M); (c) an alcohol (Q); (d) a source of hydroxide ions; (e) seed crystals comprising a zeolitic material having a TON framework type structure; and (f) water; and (2) crystallizing the mixture obtained in step (1).

The mixture can have a composition, in terms of molar ratios, within the ranges set forth in Table 1:

TABLE 1

| Reactants | Typical | Secondary |
|---|---|---|
| $SiO_2/Al_2O_3$ | 35 to 160 | 60 to 100 |
| $M/SiO_2$ | 0.05 to 1.00 | 0.10 to 0.70 |
| $Q/SiO_2$ | 0.10 to 2.00 | 0.50 to 1.75 |
| $OH/SiO_2$ | 0.02 to 1.00 | 0.05 to 0.70 |
| $H_2O/SiO_2$ | 10 to 80 | 15 to 40 | wherein M is an alkali metal and Q is an alcohol.

Alumina-coated silicas are available in a number of different $SiO_2/Al_2O_3$ molar ratios (e.g., 35, 80, 100, 127) from Nalco (Naperville, Ill.) under the tradename DVSZN007. The alumina-coated silica can comprise two or more alumina-coated silicas. Typically, the two or more alumina-coated silicas are materials having different $SiO_2/Al_2O_3$ molar ratios. The alumna-coated silica can also be the only silicon and aluminum source used to form the TON framework type zeolite.

In general, the alkali metal (M) may be provided from any suitable compound or compounds comprising one or more alkali metals. The alkali metal may be provided as an alkali metal salt. The alkali metal may comprise sodium and/or potassium. The alkali metal may be introduced into the mixture in conjunction with the source of hydroxide ions as a metal hydroxide (e.g., sodium and/or potassium hydroxide).

The alcohol may be a monohydric alcohol, a polyhydric alcohol, or a mixture of two or more thereof. The monohydric alcohol may contain from 1 to 6 carbon atoms (e.g., 2, 3, 4, 5, or 6 carbon atoms). Representative monohydric alcohols include methanol, ethanol, and propanol such as 1-propanol and 2-propanol. The polyhydric alcohol may contain from 2 to 6 carbon atoms (e.g., 3, 4, 5, or 6 carbon atoms) and from 2 to 6 hydroxyl groups (e.g., 2, 3, or 4 hydroxyl groups). Representative polyhydric alcohols include ethanediol, a propanediol, a butanediol, a pentanediol, a hexanediol, trimethylolpropane, and pentaerythritol. In some aspects, the alcohol comprises ethanol.

Without being bound by any theory, it is believed that the alcohol acts as a pore-filling agent during the synthesis of the zeolite. The alcohol is not itself an organic structure directing agent but rather provides, augments, and/or replaces the pore-filling function and the charge neutralization function of the known nitrogen-containing organotemplates used in the synthesis of TON framework type zeolites.

Seed crystals provided in step (1) comprise a zeolitic material having TON framework structure. In general, the seed crystals can comprise any zeolitic material having a TON framework type, provided that a zeolite of TON framework type is crystallized in step (2). The zeolitic material having a TON framework structure comprised in the seed crystals may be a zeolitic material obtained according to the presently disclosed process. The seed crystals may comprise one or more zeolites selected from the group consisting of ISI-1, KZ-2, NU-10, Theta-1, and ZSM-22. In some aspects, the seed crystals comprise ZSM-22. Seeds can be added in an amount of from 0.1 to 10% (e.g., 0.5 to 5%) of the weight of silica used in the reaction mixture.

In step (1) according to the present disclosure, the mixture can be prepared by any conceivable means, wherein mixing by agitation is preferred, such as by means of stirring.

In general, the components for providing the mixture of step (1) of the present process can be added in any order, provided that a zeolite of TON framework type structure is crystallized from the mixture in step (2). The mixture can be prepared either batchwise or continuously.

In general, step (2) according to the present process can be conducted in any conceivable manner, provided that a zeolite of TON framework type structure is crystallized from the mixture according to step (1). Crystallization of the zeolite from the mixture may be carried out under either static, tumbled or stirred conditions in a suitable reactor vessel, such as polypropylene jars or Teflon-lined or stainless-steel autoclaves, at a temperature of from 100° C. to 200° C. (e.g., 120° C. to 160° C.) for a time sufficient for crystallization to occur at the temperature used (e.g., 1 day to 14 days). Crystallization is usually conducted in an autoclave so that the reaction mixture is subject to autogenous pressure.

In general, the process of the present disclosure can optionally comprise further steps for the work-up and/or further physical and/or chemical transformation of the zeolite of TON framework type structure crystallized in step (2) from the mixture provided in step (1). The crystallized material can, for example, be subject to any sequence of isolation and/or washing procedures, wherein the zeolite obtained from crystallization in step (2) is preferably subject to at least one isolation and at least one washing procedure.

Isolation of the crystallized product can be achieved by any conceivable means. Preferably, isolation of the crystallized product can be achieved by means of filtration, ultrafiltration, diafiltration, centrifugation and/or decantation methods, wherein filtration methods can involve suction and/or pressure filtration steps.

With respect to one or more optional washing procedures, any conceivable solvent can be used. Washing agents which may be used are, for example, water, alcohols, such as methanol, ethanol or propanol, or mixtures of two or more hereof. Examples of mixtures are mixtures of two or more alcohols, such as methanol and ethanol or methanol and propanol or ethanol and propanol or methanol and ethanol and propanol, or mixtures of water and at least one alcohol, such as water and methanol or water and ethanol or water and propanol or water and methanol and ethanol or water and methanol and propanol or water and ethanol and propanol or water and methanol and ethanol and propanol. Water or a mixture of water and at least one alcohol, preferably water and ethanol, is preferred, distilled water being very particularly preferred as the only washing agent.

The separated zeolite may be washed until the conductivity of the washing agent (e.g., the wash-water) is less than 50 μS/cm.

Furthermore, the present process can optionally comprise one or more drying steps. In general, any conceivable means of drying can be used. Drying procedures can include heating and/or applying vacuum to the zeolite.

According to the present process, the zeolitic material crystallized in step (2) can optionally be subject to at least one step of an ion-exchange procedure, wherein the term "ion-exchange" generally refers to extra-framework cationic elements and/or molecules contained in the zeolite. Preferably, the non-framework cationic element comprises one or more of the one or more alkali metals (M) comprised in the zeolite of TON framework type structure.

In general, any conceivable ion-exchange procedure with all possible cationic elements and/or molecules can be conducted on the zeolite with the exception of organic structure directing agents specifically used in the synthesis of zeolites of TON framework type structure. Suitable replacing cations include hydrogen, ammonium, alkaline earth metals, and transition metals. Representative alkaline earth metals include magnesium, calcium, strontium, and barium. Representative transition metals include titanium, zirconium, vanadium, chromium, molybdenum, tungsten, manganese, iron, ruthenium, osmium, cobalt, iridium, nickel, palladium, platinum, copper, and zinc. The zeolite may be first ion-exchanged with $H^+$ and/or $NH_4^+$ before being subject to a further ion-exchange procedure, such being subject to ion-exchange with at least one cation and/or cationic element selected from the group consisting of an alkaline earth metal and a transition metal.

In general, the optional washing and/or isolation and/or ion-exchange procedures comprised in the present process can be conducted in any conceivably order and repeated as often as desired. Therefore, the process according to the present disclosure optionally comprises one or more of the following steps of: (3) isolating the zeolite of TON framework type structure obtained in (2); (4) washing the zeolite of TON framework type structure obtained in (2) or (3); (5) drying the zeolite of TON framework type structure obtained in (2), (3) or (4); (6) subjecting the zeolite of TON framework type structure obtained in (2), (3), (4), or (5) to an ion-exchange procedure, wherein extra-framework cations contained in the zeolite are ion-exchanged against $H^+$; (7) subjecting the zeolite of TON framework type structure obtained in (2), (3), (4), (5), or (6) to an ion-exchange procedure, wherein extra-framework cations contained in the zeolite are ion-exchanged against a metal cation selected from the group consisting of an alkaline earth metal, a transition metal, and mixtures thereof; (8) drying the zeolite of TON framework type obtained in (7).

In the process of the present disclosure, it is preferred that a calcination step is not employed. In general, a calcination step involves the heating of the zeolite crystallized according to step (2) above a temperature of 500° C. More preferably, a process according to the present disclosure for the production of a zeolite of TON framework type which does not comprise a calcination step refers to processes, wherein the zeolite crystallized according to step (2) is not subject in a subsequent step to a temperature exceeding 450° C., more preferably 350° C., more preferably 300° C., more preferably 250° C., more preferably 200° C., and even more preferably 150° C. According to the present disclosure, it is particularly preferred that after completion of step (2) of the present process, wherein the crystallized zeolite is at ambient temperature, the material is subsequently not subject to any heating process normally or suitably conducted for removal of organotemplates from a zeolite of TON framework type. Within the meaning of the present disclosure, a zeolite which is "non-calcined" is one which has not been subject to any one of the aforementioned calcination procedures.

In general, the zeolite of TON framework type obtained according to the present process may be any conceivable zeolite of the TON framework type. In some aspects, the zeolite of TON framework type formed in step (2) comprises one or more zeolites selected from the group consisting of ISI-1, KZ-2, NU-10, Theta-1, and ZSM-22, wherein the zeolite preferably comprises ZSM-22.

Characterization of the Zeolite

The organotemplate-free zeolite of TON framework type structure, prepared as described herein, can have a molar ratio of $SiO_2/Al_2O_3$ of at least 35 (e.g., 35 to 160, or 60 to 100).

In some aspects, wherein the organotemplate-free zeolite of TON framework type structure comprises an alkali metal (M) as an extra-framework cation, the molar ratio of $M/Al_2O_3$ can be in a range of from 0.005 to 10 (e.g., 0.05 to 7, 0.5 to 6, or 1 to 5).

Powder XRD patterns representative of TON framework type zeolites can be referenced in the "Collection of Simulated XRD Powder Patterns for Zeolites" by M. M. J. Treacy and J. B. Higgins (Fifth Revised Edition, Elsevier, 2007).

The powder XRD patterns presented herein were collected by standard techniques. The radiation was the K-alpha doublet of copper. Minor variations in the diffraction pattern can result from variations in the mole ratios of the framework species of the particular sample due to changes in lattice constants. In addition, sufficiently small crystals will affect the shape and intensity of peaks, leading to significant peak broadening. Notwithstanding these minor perturbations, the basic crystal lattice structure remains unchanged.

Industrial Applicability

In general, the TON framework type zeolite produced by the present process can be used as molecular sieve, adsorbent, catalyst, catalyst support or binder thereof. For example, the zeolite can be used as a molecular sieve to dry gases or liquids, for selective molecular separation; as an ion exchanger; as a chemical carrier; as an adsorbent; or as a catalyst.

In some aspects, the TON framework type zeolite produced by the present process is used in a catalytic process (e.g., as a catalyst and/or catalyst support). In general, the zeolite can be used as a catalyst and/or catalyst support in any conceivable catalytic process, wherein processes involving the conversion of at least one organic compound is preferred.

Catalysts containing the TON framework type zeolite produced by the present process are particularly useful in hydroisomerizing paraffinic hydrocarbon feedstocks when contacted by the catalyst with hydrogen at hydroisomerization conditions to yield a product having an increase in branched hydrocarbons relative to hydrocarbon feedstock.

Hydroisomerization conditions include a temperature of from 200° C. to 450° C. (e.g., 250° C. to 400° C.), a pressure of from 0.5 to 20 MPa (e.g., 1 to 15 MPa), a liquid hourly space velocity of from 0.1 to 10 $h^{-1}$ (e.g., 0.5 to 5 $h^{-1}$), and a hydrogen circulation rate of from 35.6 to 1781 $Nm^3/m^3$ (e.g., 890 to 1424 $Nm^3/m^3$).

The hydrocarbon feedstock is not limited to a specific type if the hydrocarbon feedstock includes n-C8+ hydrocarbons (e.g., n-C10+ hydrocarbons, or n-C15+ hydrocarbons). More specifically, examples of such hydrocarbon feedstocks include relatively light distilled fractions, such as kerosenes and jet fuels; and high boiling point stocks, such as fuel fractions or wax fractions derived from any type of crude oils, atmospheric distillation residues (atmospheric residues), vacuum tower residues, vacuum distillation residues (vacuum residues), cycle stocks, syncrudes (e.g., shale oil, tar oil, and the like), gas oil, vacuum gas oil, foots oil, and Fischer-Tropsch synthetic oil; and other heavy oils. Other feedstock components which may be used, especially as a co-feed component in combination with the above listed feedstocks, include renewable feedstocks originating from plants or animals.

As in the case of many catalysts, it may be desirable to incorporate the present zeolite with another material resistant to the temperatures and other conditions employed in organic conversion processes. Such materials include active and inactive materials and synthetic or naturally occurring zeolites as well as inorganic materials such as clays, silica and/or metal oxides such as alumina. The latter may be either naturally occurring, or in the form of gelatinous precipitates or gels, including mixtures of silica and metal oxides. Use of a material in conjunction with the present zeolite (i.e., combined therewith or present during synthesis of the new material) which is active, tends to change the conversion and/or selectivity of the catalyst in certain organic conversion processes. Inactive materials suitably serve as diluents to control the amount of conversion in a given process so that products can be obtained in an economic and orderly manner without employing other means for controlling the rate of reaction. These materials may be incorporated into naturally occurring clays (e.g., bentonite and kaolin) to improve the crush strength of the catalyst under commercial operating conditions. These materials (i.e., clays, oxides, etc.) function as binders for the catalyst. It is desirable to provide a catalyst having good crush strength because in commercial use it is desirable to prevent the catalyst from breaking down into powder-like materials. These clay and/or oxide binders have been employed normally only for the purpose of improving the crush strength of the catalyst.

Naturally occurring clays which can be composited with the present zeolite include the montmorillonite and kaolin family, which families include the sub-bentonites, and the kaolins commonly known as Dixie, McNamee, Ga. and Florida clays or others in which the main mineral constituent is halloysite, kaolinite, dickite, nacrite, or anauxite. Such clays can be used in the raw state as originally mined or initially subjected to calcination, acid treatment or chemical modification. Binders useful for compositing with the present zeolite also include inorganic oxides, such as silica, zirconia, titania, magnesia, beryllia, alumina, and mixtures thereof.

In addition to the foregoing materials, the present zeolite can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia silica-alumina-magnesia and silica-magnesia-zirconia.

The relative proportions of the TON framework type zeolite and inorganic oxide matrix may vary widely, with the content of the TON framework type zeolite ranging from 1 to 90 wt. % (e.g., 2 to 80 wt. %) of the composite.

EXAMPLES

The following illustrative examples are intended to be non-limiting.

Example 1 (Comparative)

An all-silica TON framework type zeolite was prepared according to the procedure described by Q. Wu et al. (*Angew. Chem. Int. Ed.* 2019, 58, 12138-12142).

0.51 g of $Na_2SiO_3 \cdot 9H_2O$ was combined with 1.56 g of silica gel and 0.12 g of seeds of an all-silica TON framework type zeolite in a Teflon autoclave. After mixing with a spatula, 1.9 g of methanol was added and quickly mixed before closing the autoclave. The autoclave was heated at 135° C. for 3 days while tumbling at 43 rpm. The product was recovered by filtration and washed with copious amounts of water and then dried in air at 85° C.

Powder XRD (not shown) indicated that the product was a TON framework type zeolite.

Example 2 (Comparative)

An aluminosilicate TON framework type zeolite was prepared according to the procedure described by Y. Wang et al. (*Catal. Today* 2014, 226, 103-108).

In a Teflon autoclave, 3.2 g of a 1 N KOH aqueous solution was combined with 8.8 g of deionized water and 0.096 g of $Al_2(SO_4)_3 \cdot 18H_2O$ and stirred until the alumina dissolved. Then, 3 g of tetraethyl orthosilicate was added and the mixture was stirred covered for several hours. Finally, 0.1 g of seeds of a TON framework type zeolite were added, and the autoclave was closed, and heated at 135° C. for 2 days while tumbling at 43 rpm. The product was recovered by filtration and washed with copious amounts of water and then dried in air at 85° C.

The material was calcined in air by placing a thin bed in a calcination dish and heated in a muffle furnace from room temperature to 120° C. at a rate of 1° C./minute and held at 120° C. for 2 hours. Then, the temperature was ramped up to 540° C. at a rate of 1° C./minute and held at 540° C. for 5 hours. The temperature was ramped up again at 1° C./minute to 595° C. and held at 595° C. for 5 hours. The material was then allowed to cool to room temperature.

The material was converted to the ammonium form by heating in a solution of ammonium nitrate (e.g., 1 g $NH_4NO_3$/1 g zeolite in 10 mL of $H_2O$ at 85° C. for at least 3 hours). The material was then filtered. This was repeated twice for a total of three exchanges. The material was washed with deionized water until a water conductivity of less than 10 μS/cm was obtained.

Powder XRD (not shown) indicated that the product was a TON framework type zeolite.

The acid site density of the product was characterized using n-propylamine temperature-programmed desorption (TPD) and found to be 31.4 μmol $H^+$/g.

Example 3 (Comparative)

In a Teflon autoclave, 3.17 g of 1 N KOH was combined with 7.2 g of deionized water and 0.096 g of $Al_2(SO_4)_3 \cdot 18H_2O$ and stirred until the alumina dissolved. Then, 3 g of tetraethyl orthosilicate was added and the mixture was stirred covered for several hours. Finally, 0.05 g of seeds of a TON framework type zeolite were added. The autoclave was closed and heated at 140° C. for 4 days while tumbling at 43 rpm. The product was recovered by filtration, washed with deionized water and then dried in air at 85° C.

The material was directly converted to the ammonium form without calcination by heating in a solution of ammonium nitrate (e.g., 1 g $NH_4NO_3$/1 g zeolite in 10 mL of $H_2O$ at 85° C. for at least 3 hours). This was repeated twice for a total of three exchanges. The material was then washed with deionized water.

Powder XRD (not shown) indicated that the product was a TON framework type zeolite.

Example 4 (Comparative)

Example 3 was repeated using 3.60 g of 1 N KOH.
Powder XRD (not shown) indicated that the product was a TON framework type zeolite.

Example 5 (Comparative)

Example 3 was repeated using 2.74 g of 1 N KOH.
Powder XRD (not shown) indicated that the product was a TON framework type zeolite.
The acid site density of the product was characterized using n-propylamine TPD and found to be 207 μmol $H^+$/g.

Example 6

Figure 1:
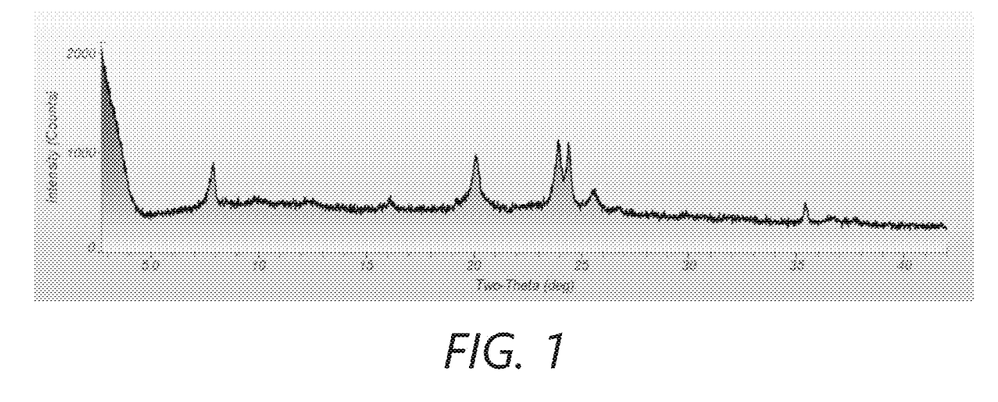
FIG. 1 shows a powder X-ray diffraction (XRD) pattern of the zeolite product of Example 6.

In a Teflon autoclave, 2.45 g of 1 N KOH was combined with 4.23 g of deionized water and 3.00 g of Nalco alumina-coated silica DVSZN007 (SAR=80; 26.9% solids). Then, 0.05 g of seeds of a TON framework type zeolite were added. Finally, 2.25 g of denatured ethanol was added and mixed well. The autoclave was closed and heated at 140° C. for 4 days while tumbling at 43 rpm. The product was recovered by filtration, washed with water and dried at 85° C.
Powder XRD indicated that the product was a TON framework type zeolite. FIG. 1 shows the powder XRD of the product.

Example 7

Figure 2:
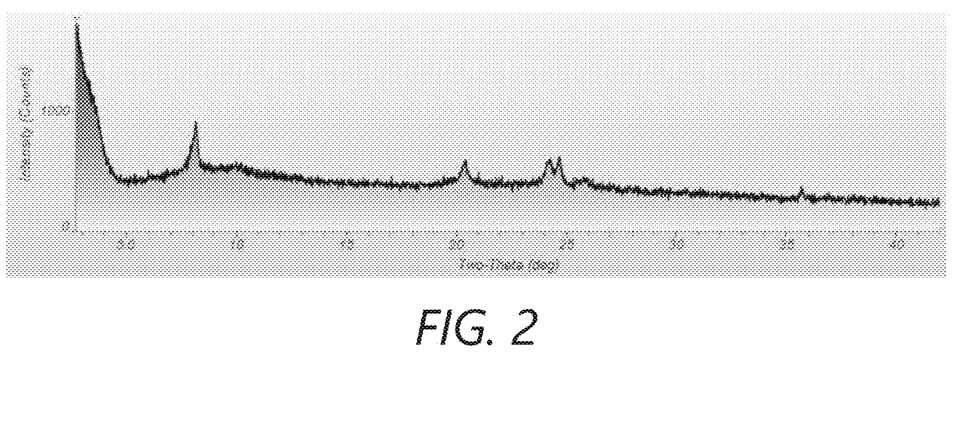
FIG. 2 shows a powder XRD pattern of the zeolite product of Example 7.

In a Teflon autoclave, 2.20 g of 1 N KOH was combined with 4.47 g of deionized water and 3.00 g of Nalco alumina-coated silica DVSZN007 (SAR=80; 26.9% solids). Then, 0.05 g of seeds of a TON framework type zeolite were added. Finally, 2.25 g of denatured ethanol was added and mixed well. The autoclave was closed and heated at 140° C. for 2 days while tumbling at 43 rpm. The product was recovered by filtration, washed with water and dried at 85° C.
Powder XRD indicated that the product was a TON framework type zeolite. FIG. 2 shows the powder XRD of the product.

Example 8

Figure 3:
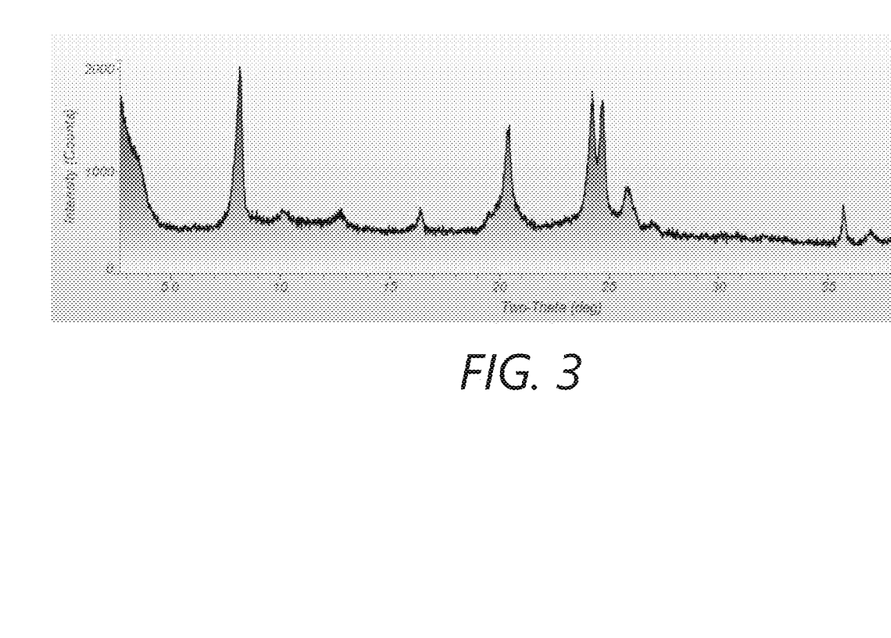
FIG. 3 shows a powder XRD pattern of the zeolite product of Example 8.

In a Teflon autoclave, 2.45 g of 1 N KOH was combined with 4.24 g of deionized water and 3.00 g of Nalco alumina-coated silica DVSZN007 (SAR=80; 26.9% solids). Then, 0.05 g of seeds of a TON framework type zeolite were added. Finally, 1.13 g of denatured ethanol was added and mixed well. The autoclave was closed and heated at 140° C. for 2 days while tumbling at 43 rpm. The product was recovered by filtration, washed with water and dried at 85° C.
Powder XRD indicated that the product was a TON framework type zeolite. FIG. 3 shows the powder XRD of the product.

Example 9 (Comparative)

Example 8 was repeated except that no denatured ethanol was added, and the reaction time was 4 days.
No crystalline product was recovered.

Example 10

Figure 4:
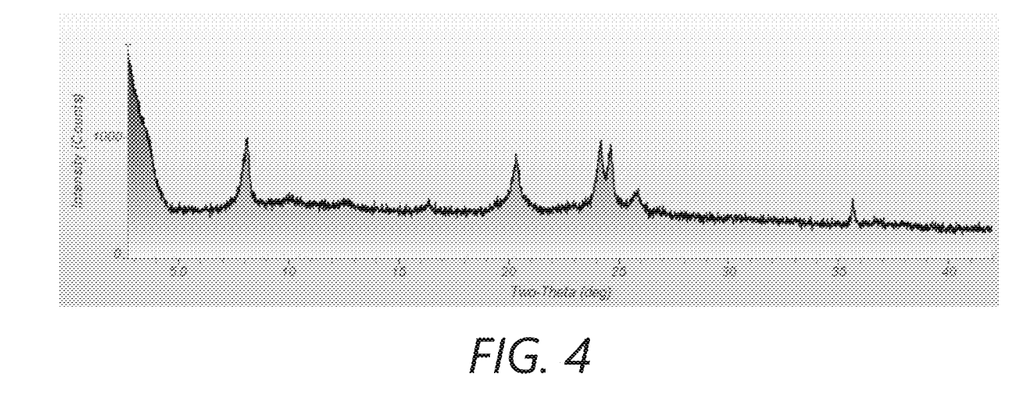
FIG. 4 shows a powder XRD pattern of the zeolite product of Example 10.
Figure 5A:
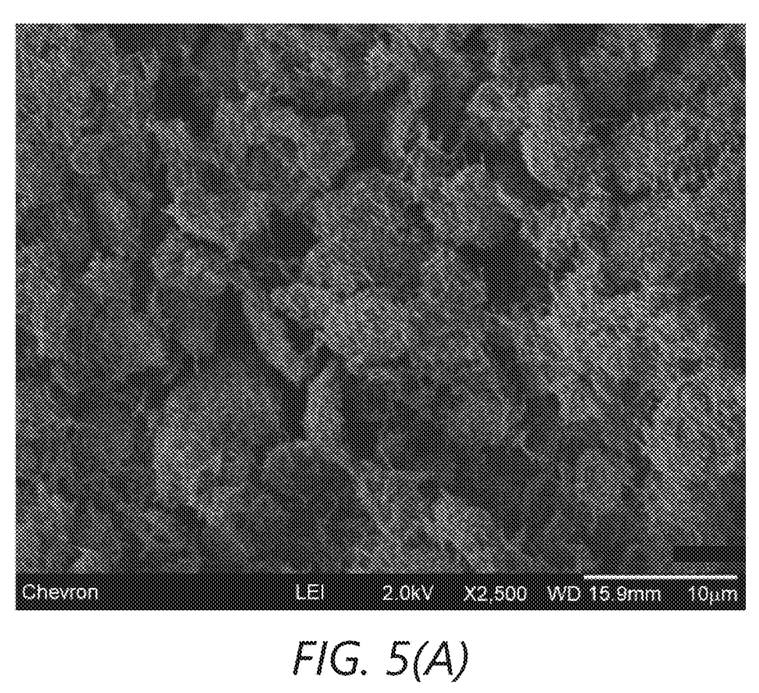
FIGS. 5(A) and 5(B) show illustrative Scanning Electron Micrograph (SEM) images of the zeolite product of Example 10 at various magnifications.
Figure 5B:
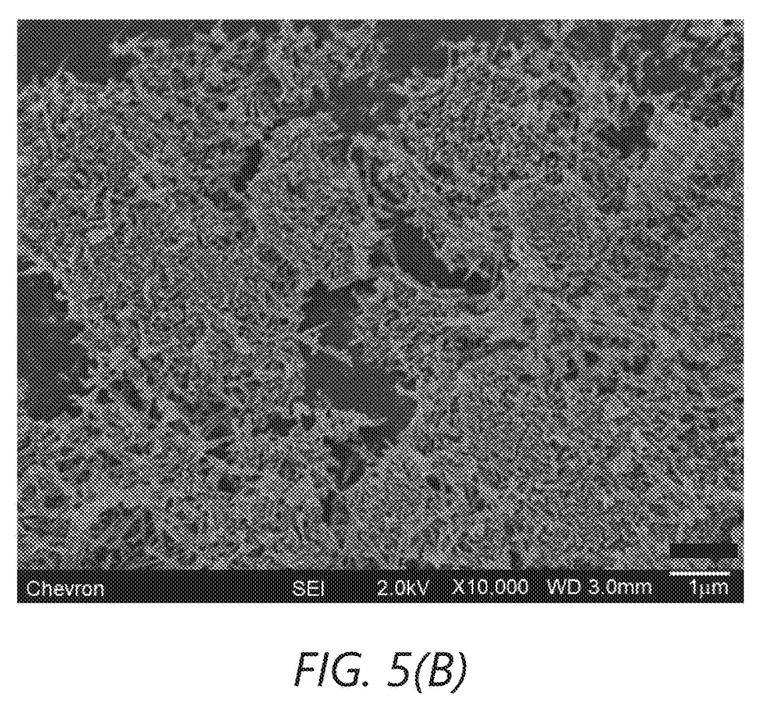

In a Teflon autoclave, 2.85 g of 1 M KOH aqueous solution was mixed with 4.95 g of water and 3.5 g of Nalco alumina-coated silica DVSZN007 (SAR=80; 26.9% solids). Then, 0.05 g of seeds of zeolite TON were added and mixed well. Finally, 1.31 g of denatured ethanol were added, mixed, and the autoclave was closed, and heated at 140° C. for 2 days while tumbling at 43 rpm. The product was recovered by filtration and washed with copious amounts of water and then dried in air at 85° C. This procedure was repeated 3 times, for a total of 4 batches, and a total of 3.43 g of dried product was recovered.
Powder XRD indicated that the product was a TON framework type zeolite. FIG. 4 shows the powder XRD of the product.
FIGS. 5A and 5B show illustrative SEM images of the product at various magnifications.
The material was directly converted to the ammonium form without calcination by heating in a solution of ammonium nitrate (typically 1 g $NH_4NO_3$/1 g zeolite in 10 mL of $H_2O$ at 85° C. for at least 3 hours). The material was then filtered. This was repeated twice for a total of 3 exchanges. The material was washed with deionized water until a water conductivity of less than 10 μS/cm was obtained.
The acid site density of the ammonium-exchanged product was characterized using n-propylamine TPD and found to be 298 μmol $H^+$/g.

Example 11

Palladium Exchange

For the palladium exchange to 0.5 wt. % Pd on the basis of the as-provided zeolite material, 1.6 g of ammonium-form TON material from Example 10 was combined with 15.3 g of deionized water and 7.0 g of 0.156 N $NH_4OH$ solution followed by 1.6 g of palladium solution that was prepared by combining a solution of 0.36 g tetraaminepalladium(II) nitrate in 21 g of deionized water with 3 g of a 0.148N $NH_4OH$ solution. The pH was then checked and, if necessary, adjusted to 10 by adding concentrated ammonium hydroxide dropwise until a pH of 10 was reached. After standing at room temperature for 3 days, the pH was checked again and, if necessary, readjusted to 10 and allowed to sit for 1 more day. The material was recovered by filtration, washed with deionized water, and dried in air overnight at 85° C. The Pd-exchanged material was then calcined in dry air by heating at 1° C./minute ramp to 120° C. and holding at 120° C. for 180 minutes, and then heating at 1° C./minute to 482° C. and holding at 482° C. for 180 minutes. Finally, the material was pelletized at 5 kpsi, crushed and sieved to 20-40 mesh.

Example 12

Hydroconversion of n-Decane

Figure 6:
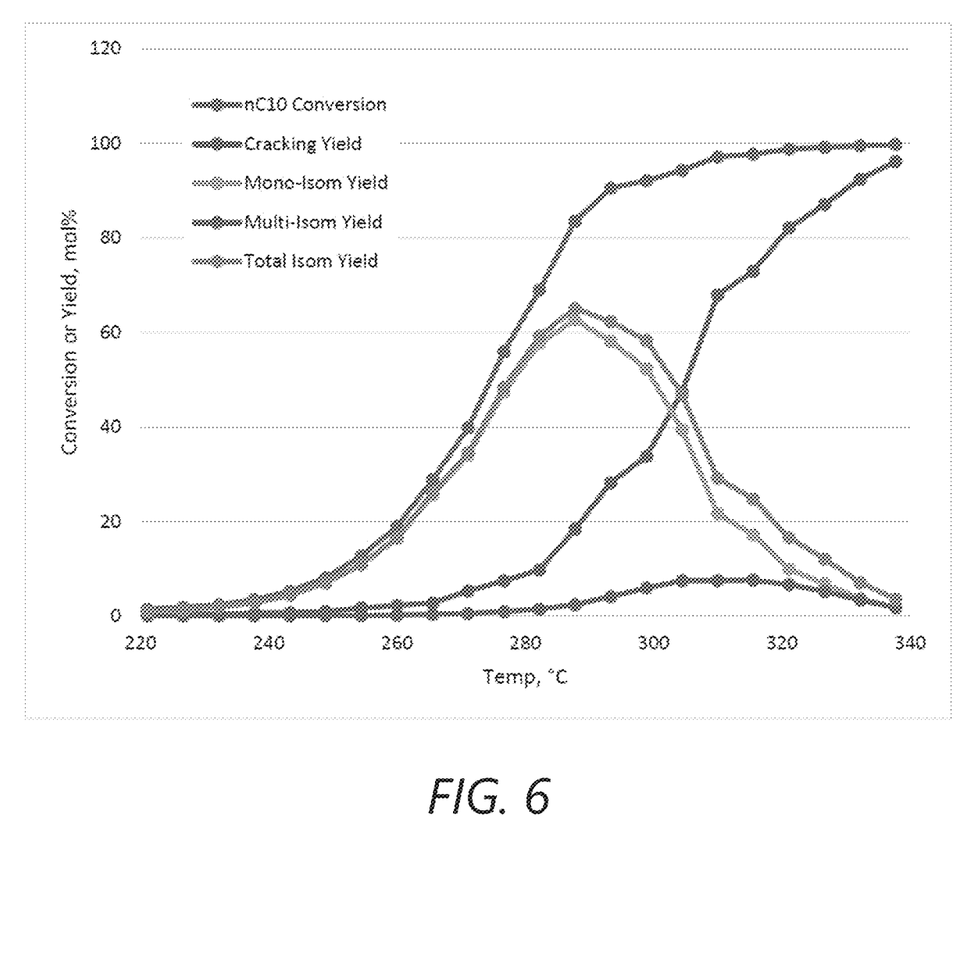
FIG. 6 is a graph illustrating conversion or yield as a function of temperature in the hydroconversion of n-decane over a Pd/TON catalyst.
Figure 7:
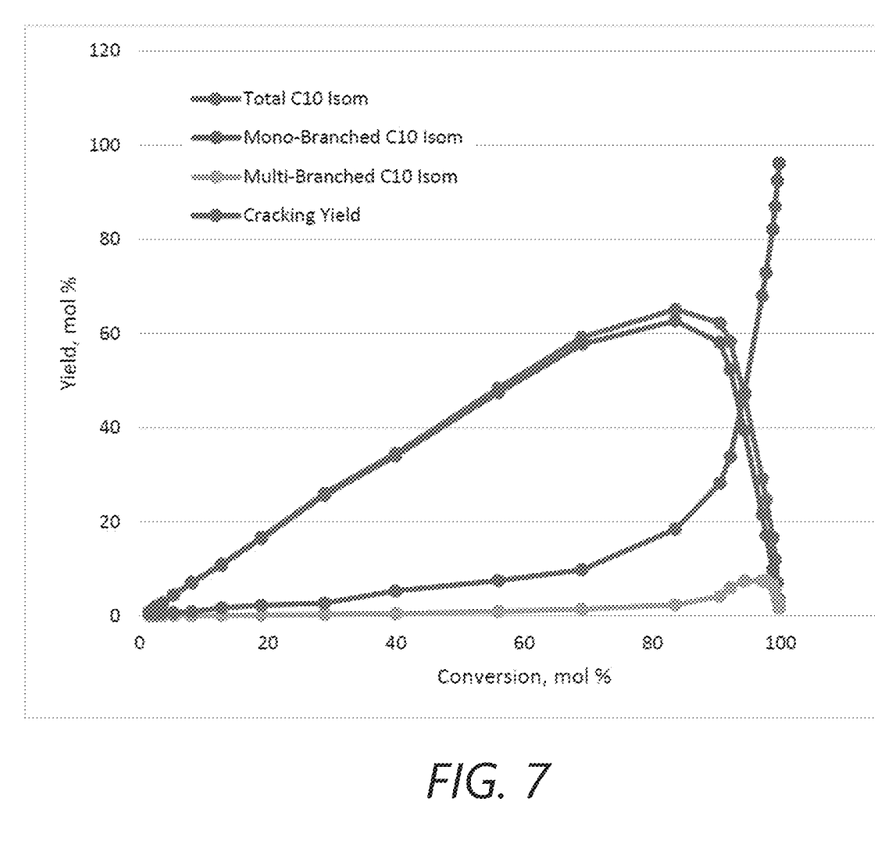
FIG. 7 is a graph illustrating product yields as a function of conversion in the hydroconversion of n-decane over a Pd/TON catalyst.
Figure 8:
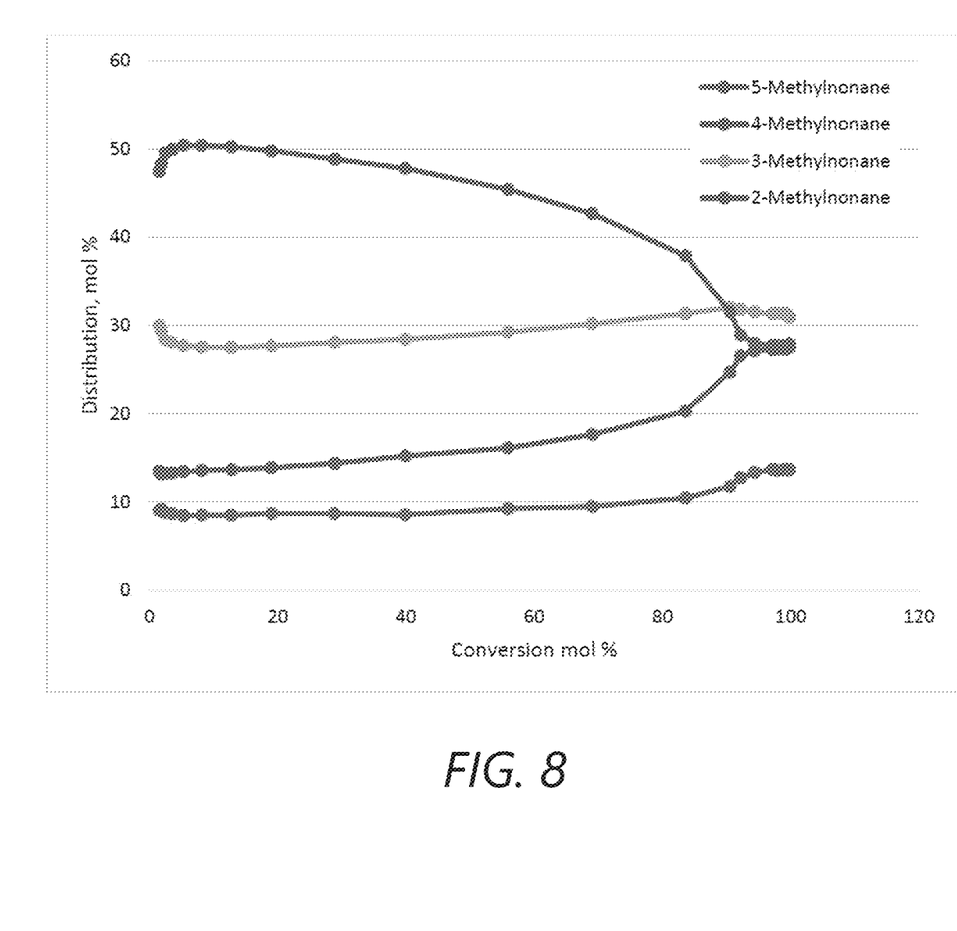
FIG. 8 is a graph illustrating distribution of methylnonane isomers as a function of conversion in the hydroconversion of n-decane over a Pd/TON catalyst.
Figure 9A:
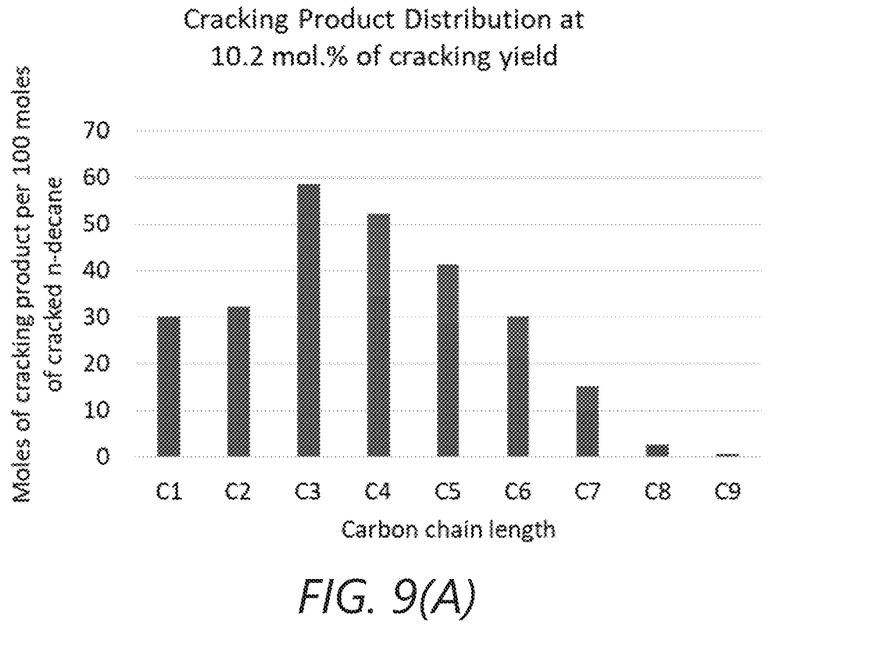
FIGS. 9(A) to 9(D) are graphs illustrating cracking product distributions in the hydroconversion of n-decane over a Pd/TON catalyst.
Figure 9B:
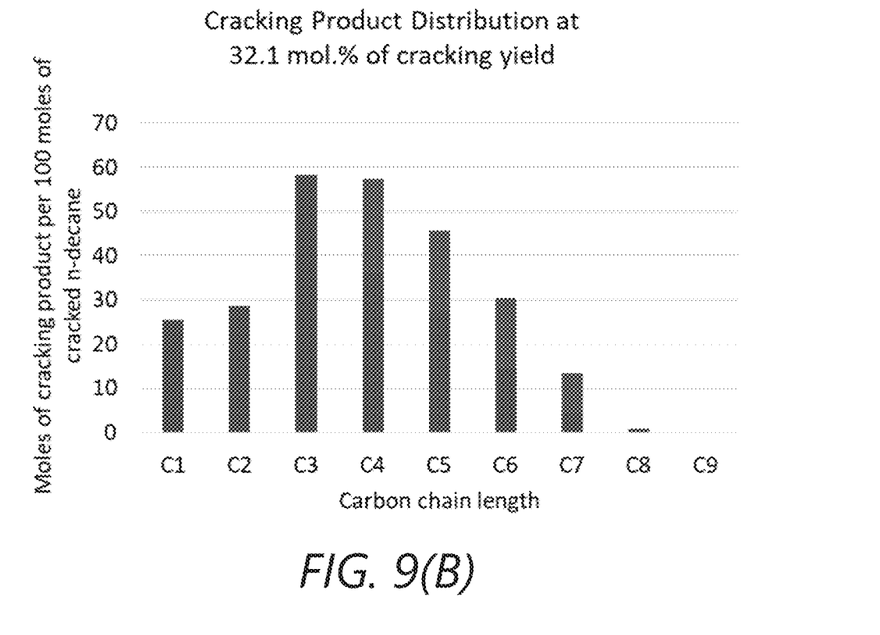
Figure 9C:
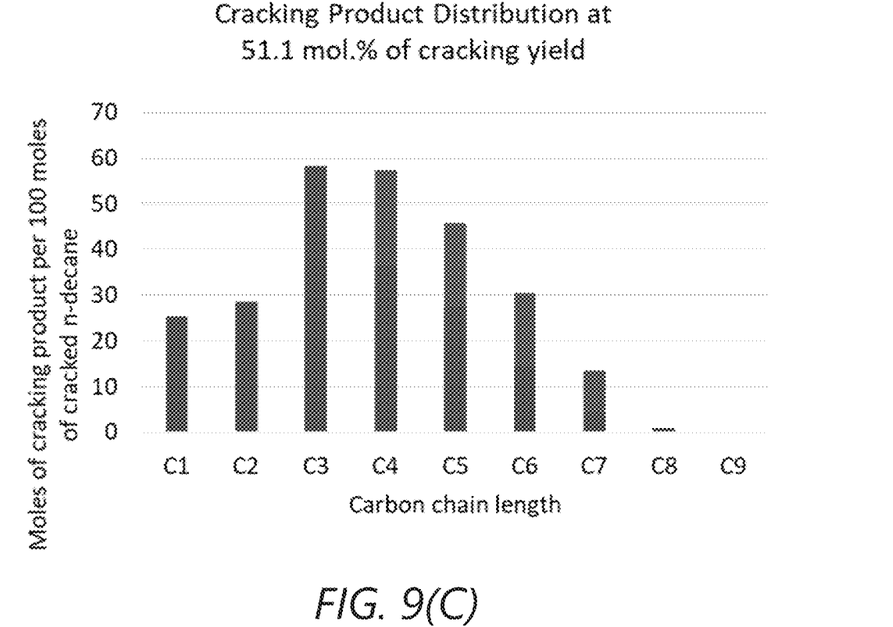
Figure 9D:
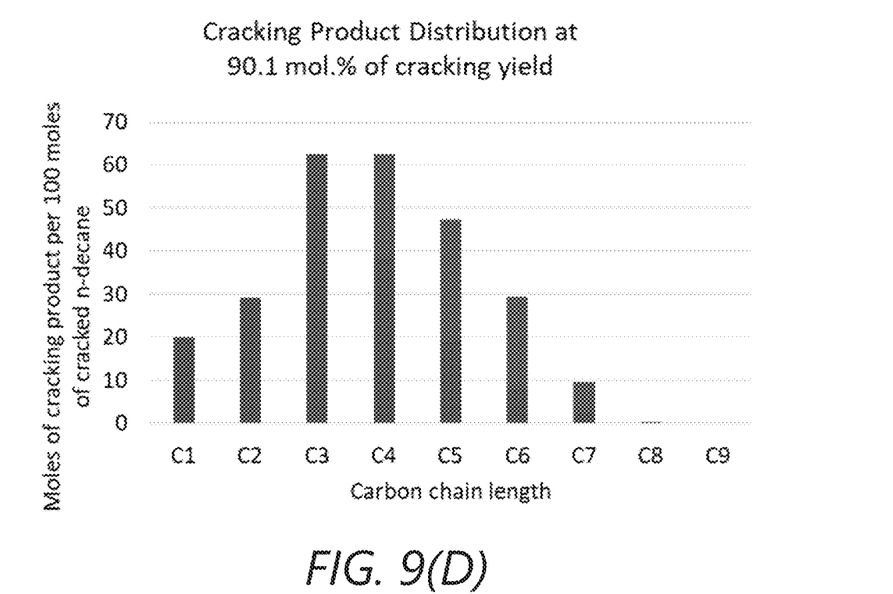

For catalytic testing, 0.5 g of the Pd/TON catalyst (weight of the dehydrated sample as determined by thermogravimetric analysis at 600° C.) from Example 11 was loaded in the center of a 23 inch-long×¼ inch outside diameter stainless steel reactor tube with alundum loaded upstream of the catalyst for preheating the feed (a total pressure of 1200 psig; a down-flow hydrogen rate of 12.5 mL/minute, when measured at 1 atmosphere pressure and 25° C.; and a down-flow liquid feed rate of 1 mL/hour). The catalyst was first reduced in flowing hydrogen at 315° C. for 1 hour. The reaction was carried out from 230° C. to 310° C. Products were analyzed by on-line capillary gas chromatography (GC) approximately once every 60 minutes. Raw data from the GC was collected by an automated data collection/processing system and hydrocarbon conversions were calculated from the raw data. Conversion is defined as the amount n-decane reacted in mol % to produce other products (including iso-C10). The yield of iso-C10 is expressed as mole percent of products other than n-decane. The yield of cracking products (smaller than C10) is expressed as mole percent of n-decane converted to cracking products. The results are shown in FIG. 6 and FIG. 7. The distribution of methylnonane isomers as a function of conversion in the hydroconversion of n-decane is shown in FIG. 8. The cracking product distributions at 10.2 mol. %, 32.1 mol. %, 51.1 mol. % and 90.1 mol. % of cracking yield are shown in FIG. 9(A), FIG. 9(B), FIG. 9(C) and FIG. 9(D), respectively.

The Modified Constraint Index (CI*) was calculated as the ratio of 2-methylnonane to 5-methylnonane at the total isomer yield of around 5%, as described by P. A. Jacobs et al. (*Zeolites* 1984, 4, 98-107). In this example, the Modified Constraint Index (CI*) was found to be 5.9 at a total isomer yield of 4.8%.

Example 16

Hydroisomerization of n-Hexadecane 0.5 g of the palladium exchanged sample of Example 11 was loaded in the center of a 23 inch-long×¼ inch outside diameter stainless steel reactor tube with alundum loaded upstream of the catalyst for pre-heating the feed (total pressure of 1200 psig; down-flow hydrogen rate of 160 mL/minute, when measured at 1 atmosphere pressure and 25° C.); down-flow liquid feed rate of 1 mL/hour. All materials were first reduced in flowing hydrogen at about 315° C. for 1 hour. Products were analyzed by on-line capillary GC once every thirty minutes. Raw data from the GC was collected by an automated data collection/processing system and hydrocarbon conversions were calculated from the raw data.

Conversion was defined as the amount of n-hexadecane reacted to produce other products (including iso-C16 isomers). Yields were expressed as weight percent of products other than n-C16 and included iso-C16 as a yield product. The results at 96% conversion are reported in Table 2.

TABLE 2

| Selectivity [%] | 80 |
| Temperature [°] | 560 |
| C4- Cracking [%] | 3 |

The invention claimed is:

1. An organotemplate-free synthetic process for producing a zeolite having a TON framework structure, wherein the process comprises the steps of:
    (1) preparing a mixture comprising:
        (a) an alumina-coated silica;
        (b) a source of an alkali metal (M);
        (c) an alcohol (Q);
        (d) a source of hydroxide ions;
        (e) seed crystals comprising a zeolite having a TON framework structure; and
        (f) water; and
    (2) crystallizing the mixture obtained in step (1);
    wherein the mixture has a composition, in terms of molar ratios, as follows:

| $SiO_2/Al_2O_3$ | 35 to 160 |
| $M/SiO_2$ | 0.05 to 1.00 |
| $Q/SiO_2$ | 0.10 to 2.00 |
| $OH/SiO_2$ | 0.02 to 1.00 |
| $H_2O/SiO_2$ | 10 to 80. |

2. The process of claim 1, wherein the mixture has a composition, in terms of molar ratios, as follows:

| $SiO_2/Al_2O_3$ | 60 to 100 |
| $M/SiO_2$ | 0.10 to 0.70 |
| $Q/SiO_2$ | 0.50 to 1.75 |
| $OH/SiO_2$ | 0.05 to 0.70 |
| $H_2O/SiO_2$ | 15 to 40. |

3. The process of claim 1, wherein the alcohol is selected from the group consisting of a monohydric alcohol, a polyhydric alcohol, and a mixture thereof.

4. The process of claim 1, wherein the alcohol has from 1 to 6 carbon atoms.

5. The process of claim 1, wherein the alcohol is selected from the group consisting of methanol, ethanol, propanol, ethanediol, a propanediol, a butanediol, a pentanediol, a hexanediol, trimethylolpropane, pentaerythritol, and a mixture thereof.

6. The process of claim 1, wherein the alcohol comprises ethanol.

7. The process of claim 1, wherein the alkali metal (M) comprises sodium, potassium, or a mixture thereof.

8. The process of claim 1, wherein the seed crystals are present in an amount of from 0.1 to 10% of the weight of silica.

9. The process of claim 1, wherein the seed crystals comprise one or more zeolites selected from the group consisting of ISI-1, KZ-2, NU-10, Theta-1, ZSM-22, and mixtures thereof.

10. The process of claim 1, wherein the crystallizing in step (2) comprises heating the mixture at a temperature of from 100° C. to 200° C. under autogenous pressure and for a time of from 1 day to 14 days.

11. The process of claim 1, wherein the zeolite having a TON framework structure formed in step (2) comprises a material selected from the group consisting of ISI-1, KZ-2, NU-10, Theta-1, ZSM-22, and mixtures thereof.

12. The process of claim 1, further comprising one or more of the following steps of:
    (3) isolating the zeolite having a TON framework structure obtained in (2);
    (4) washing the zeolite having a TON framework structure obtained in (2) or (3);
    (5) drying the zeolite having a TON framework structure obtained in (2), (3) or (4);
    (6) subjecting the zeolite having a TON framework structure obtained in (2), (3), (4), or (5) to an ion-exchange procedure, wherein extra-framework cations contained in the zeolite are ion-exchanged against H+;
    (7) subjecting the zeolite having a TON framework structure obtained in (2), (3), (4), (5), or (6) to an ion-exchange procedure, wherein extra-framework cations contained in the zeolite are ion-exchanged against a metal cation selected from the group consisting of an alkaline earth metal, a transition metal, and mixtures thereof;
(8) drying the zeolite having a TON framework structure obtained in (7).

13. The process of claim 1, wherein the organotemplate-free synthetic process does not comprise a calcination step.

* * * * *